United States Patent [19]

Janich

[11] Patent Number: 5,193,823

[45] Date of Patent: Mar. 16, 1993

[54] RESILIENT METALLIC SEALING MEMBER

[75] Inventor: Hans-Jürgen Janich, Beckum, Fed. Rep. of Germany

[73] Assignee: Mannesmann Aktiengesellschaft, Fed. Rep. of Germany

[21] Appl. No.: 893,902

[22] Filed: Jun. 4, 1992

Related U.S. Application Data

[63] Continuation of Ser. No. 679,162, Mar. 26, 1991, which is a continuation of Ser. No. 337,388, Apr. 13, 1989, abandoned.

[30] Foreign Application Priority Data

May 5, 1988 [DE] Fed. Rep. of Germany ....... 3815402

[51] Int. Cl.$^5$ ........................................... F16J 15/08
[52] U.S. Cl. ..................................... 277/189; 277/236
[58] Field of Search ................ 277/235 R, 235 B, 236

[56] References Cited

U.S. PATENT DOCUMENTS

| | | | |
|---|---|---|---|
| 2,345,743 | 4/1944 | Gaston | 49/479 |
| 2,400,470 | 5/1946 | Spraragen | 49/495 X |
| 2,657,438 | 11/1953 | Spraragen | 49/497 X |
| 2,895,759 | 7/1959 | Conrad et al. | 277/199 |
| 2,905,985 | 9/1959 | Garrett et al. | 49/499 |
| 3,013,314 | 12/1961 | Beltz et al. | 49/469 |
| 3,020,185 | 2/1962 | Moffitt, Jr. et al. | 277/181 X |
| 3,029,805 | 9/1962 | Scott | 49/479 |
| 3,037,251 | 6/1962 | Landis | 49/497 X |
| 4,441,726 | 4/1984 | Uhl | 277/230 |
| 4,527,773 | 7/1985 | Müller et al. | 251/328 |
| 4,660,805 | 4/1987 | Hahn et al. | 251/328 |
| 4,724,863 | 2/1988 | Connor | 251/328 |

FOREIGN PATENT DOCUMENTS

| | | | |
|---|---|---|---|
| 2502240 | 7/1976 | Fed. Rep. of Germany. | |
| 8800255.1 | 4/1988 | Fed. Rep. of Germany. | |
| 182914 | 3/1936 | France | 49/495 |
| 899225 | 10/1943 | France | 49/479 |
| 939443 | 12/1946 | France | 49/498 |
| 1079667 | 8/1967 | United Kingdom | 49/488 |
| 8102604 | 9/1981 | World Int. Prop. O. | 49/498 |

Primary Examiner—William A. Cushlinski, Jr.
Assistant Examiner—Scott W. Cummings
Attorney, Agent, or Firm—Learman & McCulloch

[57] ABSTRACT

The invention relates to a device for sealing the space between two relatively movable parts, the sealing device being an integral, springy metal member shaped to form a hollow body having a domed top, two spaced apart side walls, and a bottom wall. Extensions are joined to one side wall and to the bottom wall and project in the same direction beyond the housing. The extensions overlie and are secured to one another.

21 Claims, 5 Drawing Sheets

RESILIENT METALLIC SEALING MEMBER

This is a continuation of copending application Ser. No. 07/337,388 filed on Apr. 13, 1989 (now abandoned) which is a continuation of Ser. No. 07/679,162 filed on Mar. 26, 1991.

The invention relates to a device for sealing the contact zone between a movable equipment part and a fixed equipment part.

BACKGROUND OF THE INVENTION

Devices of the type referred to serve for example to ensure a reliable and gas-tight seal between a movable shut-off element (for instance a hinge flap or a slide valve plate) of a hot gas pipe of large dimensions and a stationary seat.

In the known constructions of this type, the two flat long edge regions of the sealing element represent a straight-line extension of the curved zone, and these two flat long edge regions are generally fixed by means of separate clamping arrangements. The principal disadvantages of these known constructions are that the overall height is considerable and installation is difficult.

The object of the invention, therefore, is to provide a device in which the overall height of the sealing element is substantially reduced. In a further development of the invention installation and removal of the sealing element are substantially simplified.

SUMMARY OF THE INVENTION

According to the invention a sealing element has a hollow, deformable body having a domed top wall, two spaced apart side walls and a bottom wall. Extensions projecting from the body are bent to overlie one another and extend longitudinally of the body. Such a construction of the sealing element makes it possible to achieve the spring rigidity of the sealing element which is desired for the particular application with a minimum overall height. At the same time the installation and removal of the sealing element is substantially simplified according to the invention.

According to one advantageous embodiment of the invention, the two extensions of the sealing elements are firmly connected to one another and in the connected state can be jointly fixed by means of a clamp. In such a construction the fixed connection of the two extensions and thus the curving of the top wall of the sealing element as well as the production of the spring tension can be carried out in the factory. Then, when the sealing device is being installed, it is merely necessary for the two extensions of the sealing element to be jointly fixed by means of the clamp, which does not present any problems in view of the fixed connection of the extensions. The removal of the sealing element, for example for the purpose of replacing it, is equally simple.

THE DRAWINGS

DETAILED DESCRIPTION

Figure 1:
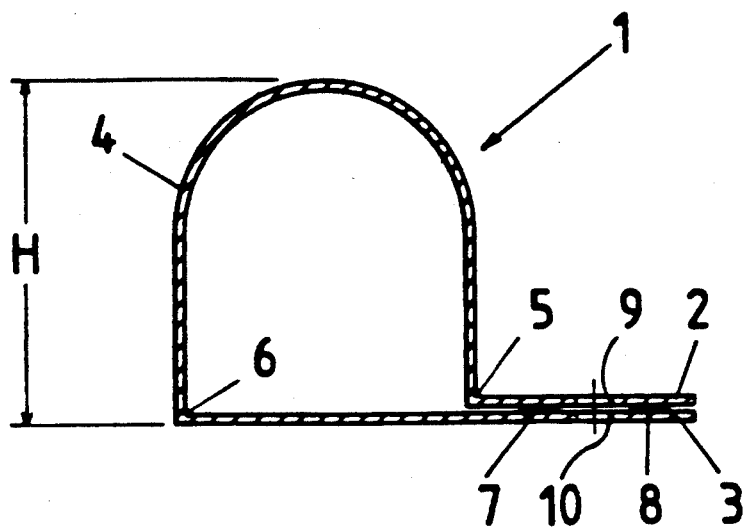
FIG. 1 is a cross-sectional view of a sealing element constructed according to one embodiment of the invention before installation.

The sealing element 1 illustrated in FIG. 1 is formed by an elongated spring steel strip which is shown in cross-section and is shaped to form a hollow, deformable body 4 having two spaced side walls, a convexly domed top, and a bottom wall. Extending from the body are two flat, overlying, parallel extensions 2 and 3. A bend 5 of substantially 90° is provided between the flat extension 2 and the adjacent side wall. A corresponding bend 6 is located between the other side wall t form the bottom wall and the extension 3. The two extensions 2 and 3 are flat and extend beyond the body in prolongation of the bottom wall at right angles to the longitudinal extent thereof and towards the same side.

The two extensions 2 and 3 are firmly connected to one another at certain intervals (at right angles to the drawing plane of FIG. 1) by spot welds 7, 8, and these welded connections take up the spring tension of the curved zone 4.

Through holes 9, 10 are also provided at certain intervals in the extensions 2, 3 to receive connecting clamps.

Figure 2:
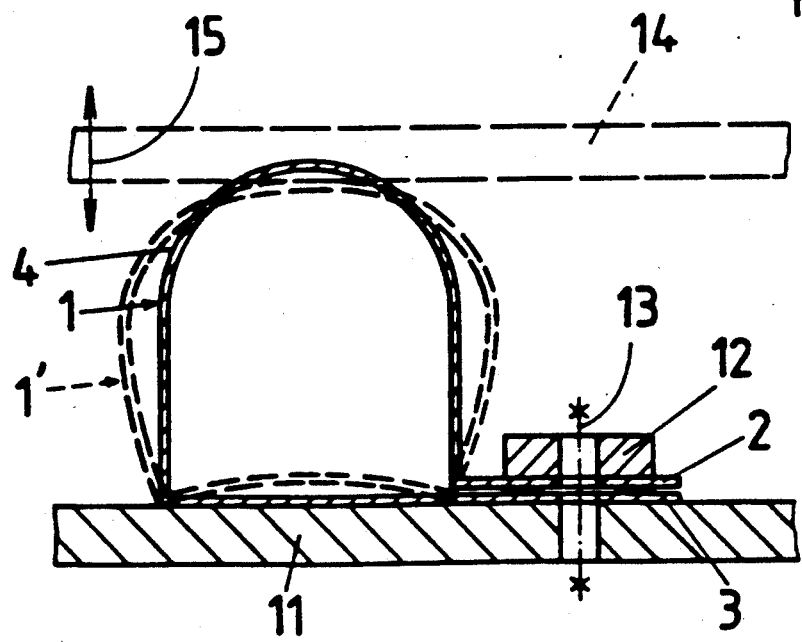
FIG. 2 shows the sealing element according to FIG. 1 in the installed state.

FIG. 2 shows the sealing element 1 according to FIG. 1 in the installed state. The flat extensions 2, 3 are fixed between a stationary seat 11 and a clamping strip 12, the clamping strip 12 being connected to the stationary seat 11 by means of connecting elements 13.

A movable shut-off element 14, which can be formed for example by a hinged flap or a slide valve plate and is movable in the direction of the arrow 15 to apply compressive force on the sealing element, cooperates with the stationary seat 11.

In the closed position of the shut-off element 14, the sealing element 1 comes to rest with a part of its curved zone 4 on the shut-off element 14 and the top, bottom and side walls are thereby elastically deformed as illustrated by the contour 1' shown in broken lines in FIG. 2.

The installation and removal of the sealing element 1 is extremely simple and can readily be carried out by one person alone. In the installation of the prefabricated sealing element, the extensions 2 and 3 of which are firmly connected to one another, the clamping strip 12 is merely placed on it and the flat long edge regions 2, 3 are fixed by means of the connecting elements 13. Any replacement of the sealing element which may be necessary is equally simple.

In the embodiment according to FIG. 2 the two extensions 2, 3 of the sealing element 1 are arranged at right angles to the direction of movement (arrow 15) of the movable part of the equipment (shut-off element 14). This construction produces a particularly low installation height H of the sealing element.

Figure 3:
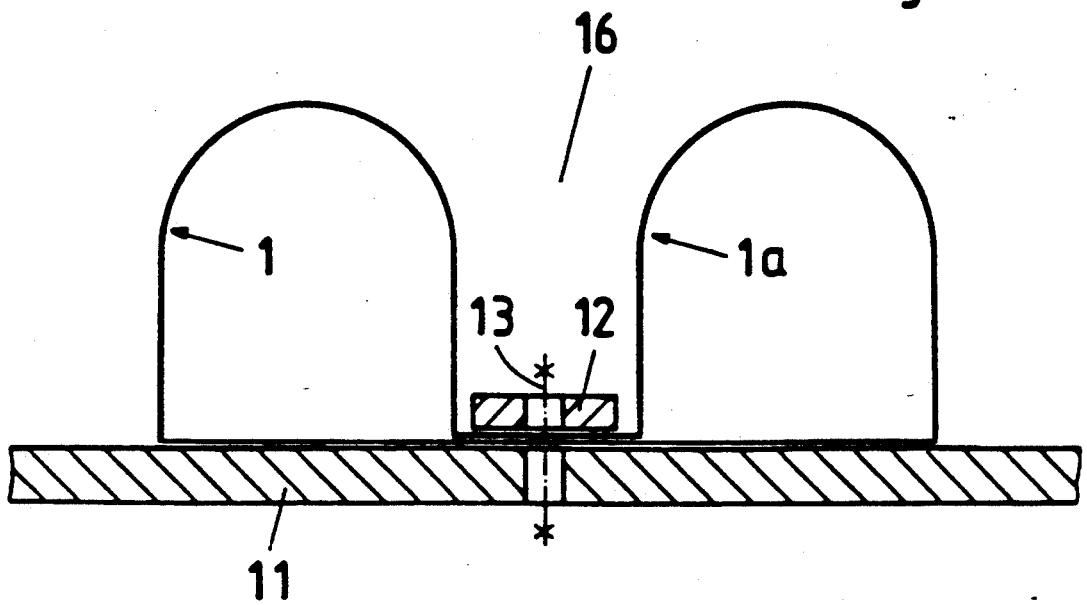
FIGS. 3 to 8 are diagrammatic, sectional views of further embodiments of the invention.

In the embodiment according to FIG. 3 two sealing bodies 1 and 1a which can be fixed by means of the same clamping strip 12 are provided in mirror symmetry. Such a construction is advantageous for example when a gaseous sealing medium, e.g. sealing air, is to be introduced into the space 16 between the two bodies 1 and 1a. The two bodies are joined by overlying extensions like the extensions 2 and 3.

Figure 4:
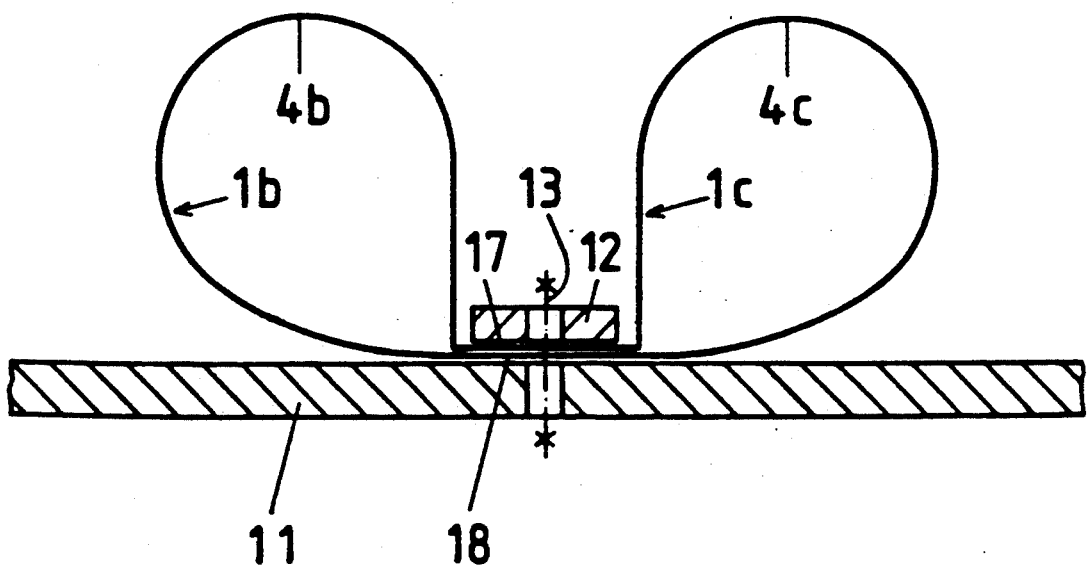

In the embodiment according to FIG. 4 two sealing bodies 1b, 1c which are constructed in mirror symmetry are united in one integral double sealing element, and have central extensions 17, 18 lying between and joining the two curved zones 4b, 4c. The extensions 17, 18 overlie one another and are fixed by means of the clamping strip 12 and the connecting elements 13. The two extensions 17, 18 of this double sealing element are firmly connected to one another, preferably by spot welding, so that they can be jointly fixed in the ready-connected state by means of the clamping arrangement. In this embodiment the bottom wall of each body is arcuate, rather than flat.

Figure 5:
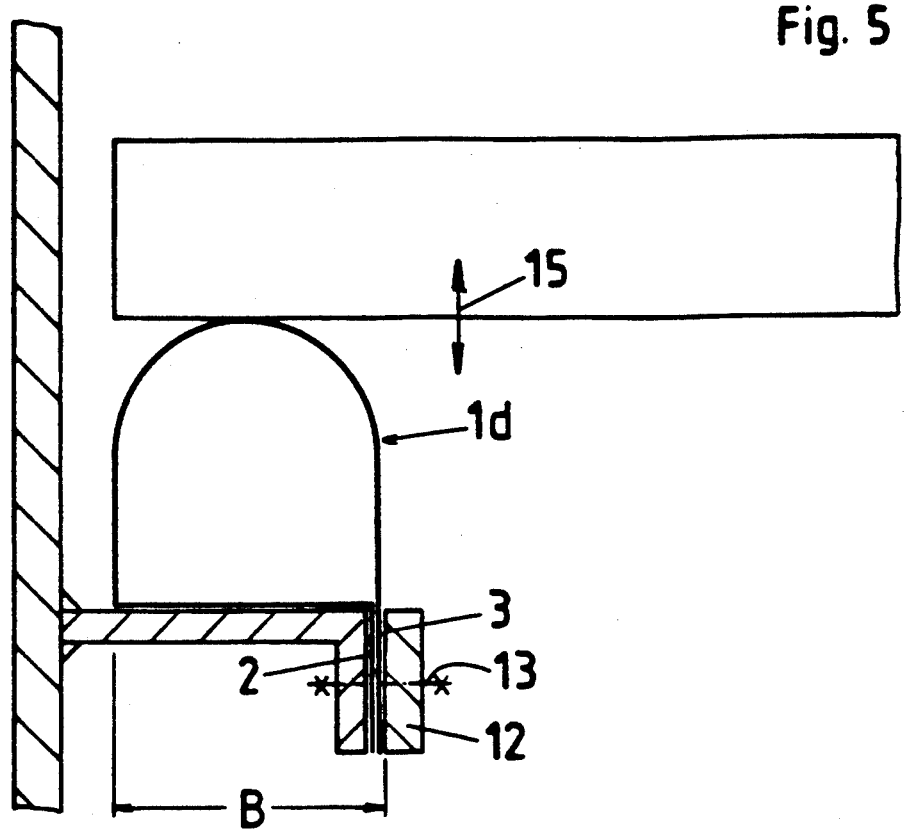

FIG. 5 shows an embodiment in which the two extensions 2, 3 of the sealing element 1d are arranged to extend in prolongation of one side wall of the body and parallel to the direction of movement (arrow 15) of the movable part of the equipment (shut-off element 14). Here too the two extensions 2 and 3 which are firmly connected to one another are jointly fixed by means of a clamping strip 12 and connecting elements 13. This construction is distinguished by a particularly small overall width B of the sealing element 1d.

Figure 6:
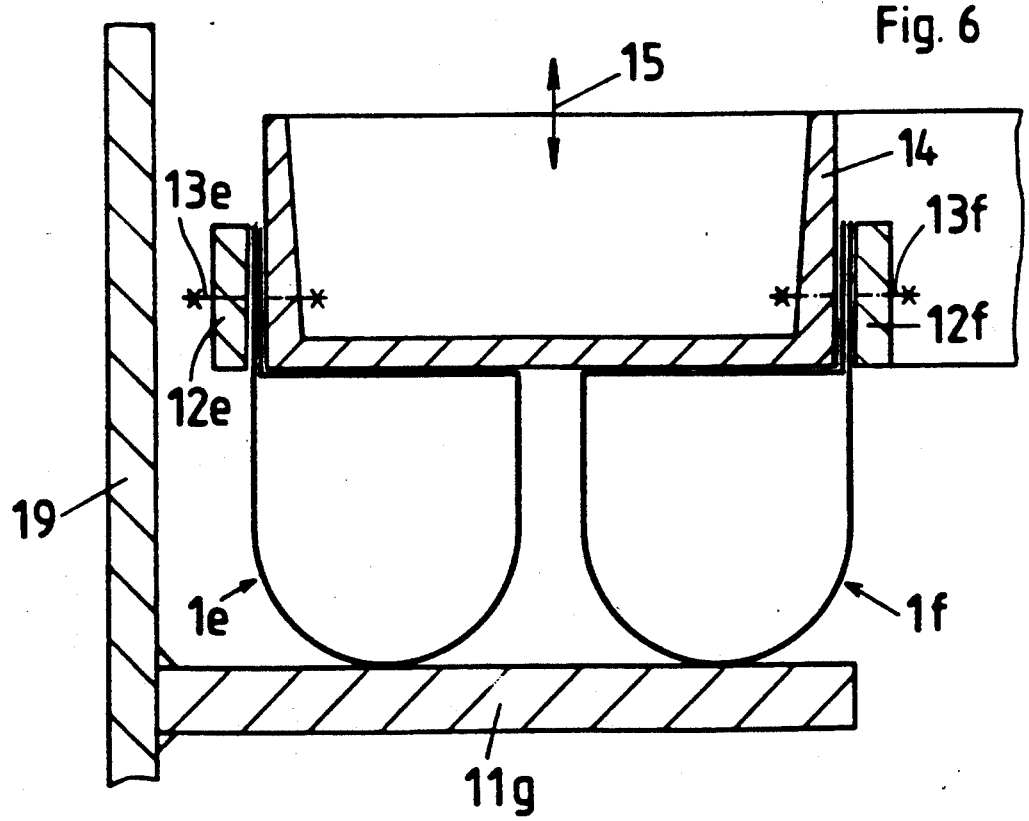

In the embodiment according to FIG. 6 the two sealing elements 1e and 1f are fixed on the movable shut-off element 14 by means of separate clamping strips 12e and 12f and connecting elements 13e and 13f respectively.

In the closed position of the movable shut-off element 14 the sealing elements 1e and 1f come to rest on the stationary seat 11g, for example a collar of the pipe housing 19.

As in the embodiments described above, in the variant according to FIG. 6 the two extensions are also firmly connected to one another, preferably by spot welding, so that they can be jointly fixed in the ready-connected state with the aid of the clamping arrangement.

Figure 7:
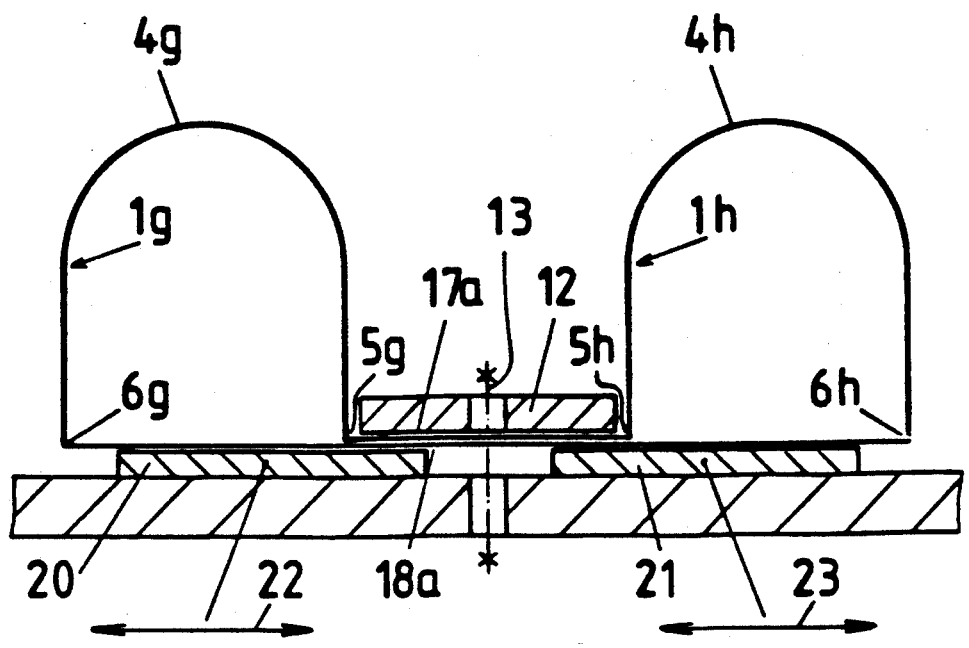

FIG. 7 shows an embodiment in which (as in FIG. 4) sealing elements 1g and 1h are united to form one integral double sealing element. As in the arrangement according to FIGS. 1 and 2, the two sealing elements each have two bends 5g, 6g and 5h, 6h respectively by means of which the central extensions 17a, 18a are connected to the curved zones 4g and 4h respectively.

The region of the sealing elements 1g, 1h located between the two bends 5g, 6g and 5h, 6h respectively is supported with a part of its width on a support 20 or 21 which is movable in the direction of the arrows 22, 23. The spring force of the sealing elements 1g, 1h can be set within wide limits by moving these supports 20, 21. For example, a substantially reduced spring force, i.e. a weaker springiness of the sealing element, is produced if the support 20 is moved towards the right.

Figure 8:
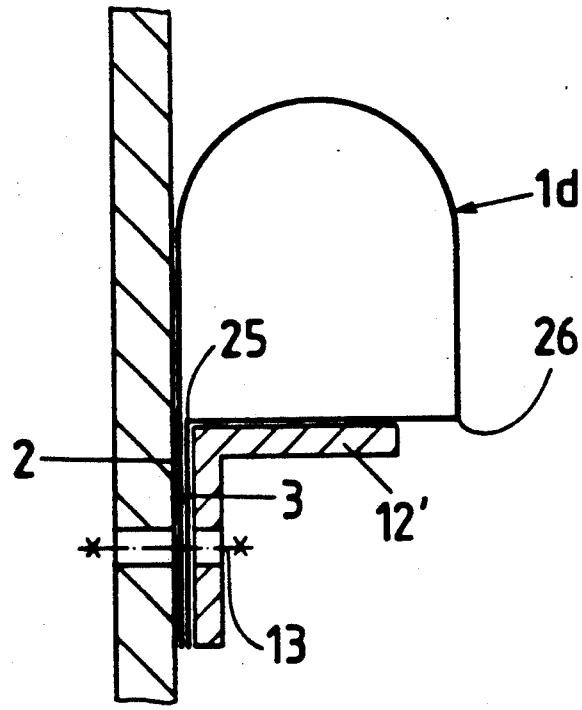

A similar means for alteration of the spring force is shown in FIG. 8. The sealing element 1d here corresponds to that of the embodiment according to FIG. 5. An angled clamping strip 12' serves for fixing of the extensions 2 and 3, and one arm of the clamping strip supports the region of the sealing element located between the bends 25 and 26 on only a part of its width. By altering the length of this arm it is possible to bring the spring force of the sealing element to the desired value in a simple manner.

Figure 9:
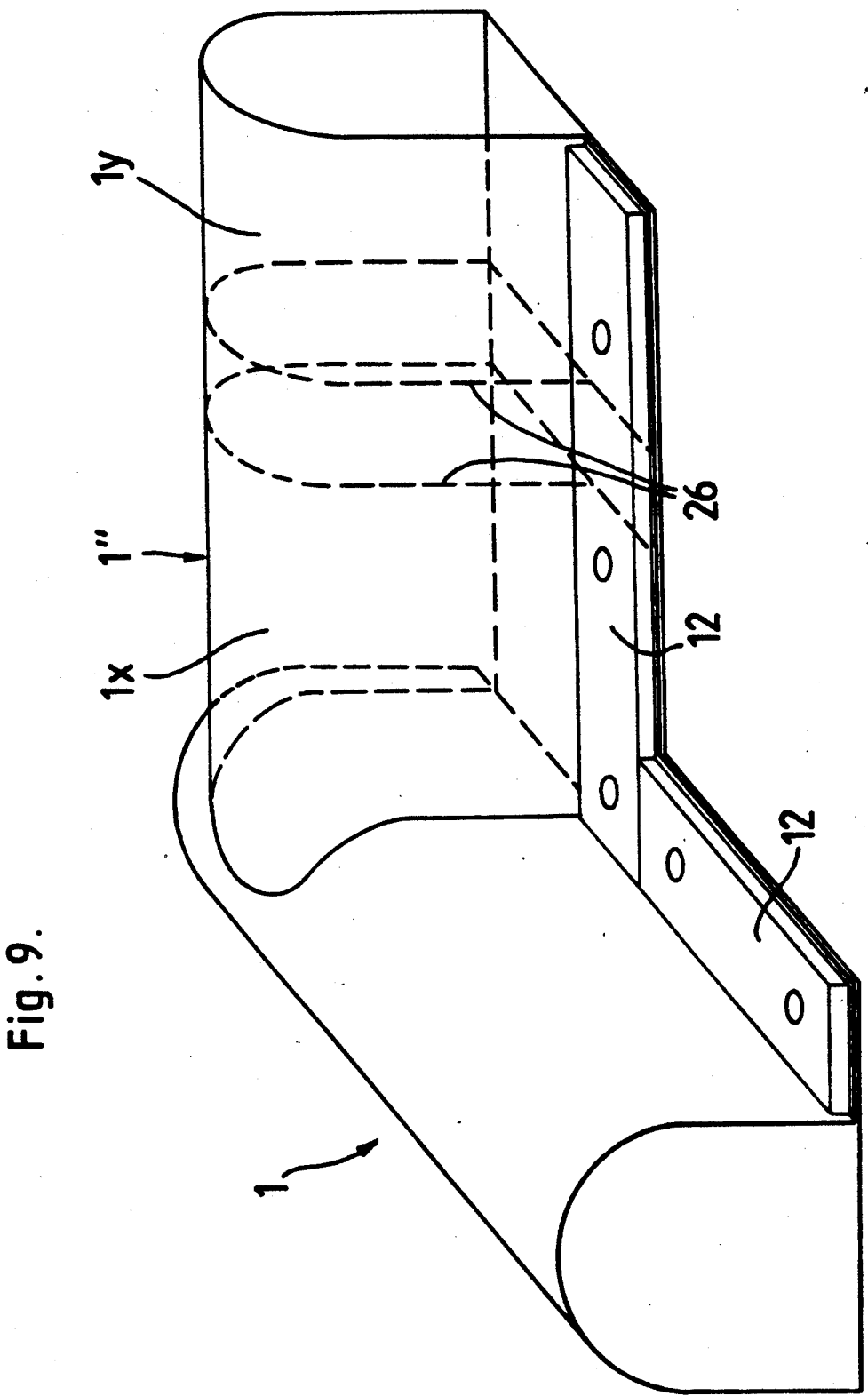
FIG. 9 is a diagrammatic isometric view of two sealing elements in abutting relation.

FIG. 9 shows how the contact points at the corners can be constructed in the case of a sealing device composed for a plurality of sealing elements. Of the two sealing elements 1 and 1" shown in FIG. 9, the saling element 1" butts against the other sealing element 1 at an angle of approximately 90°, and the latter sealing element 1 projects somewhat beyond the contact point.

The sealing element 1" has at its end facing the other sealing element 1 a thrust piece 1x which overlaps the main part 1y of the sealing element 1" (overlap 26) and is freely movable in the axial direction of the sealing element 1" for the purpose of adjustment. In this way, during installation of the sealing device the thrust piece 1x can be pushed forwards until it rests on the sealing element 1 and can be fixed in this position by the appertaining clamping strip 12.

The sealing elements 1 and 1" butt loosely, that is to say unconnected, against one another. Equally a loose overlap between the main part 1y and the thrust piece 1x of the sealing element 1" is sufficient. The thrust piece 1x is cut out at its end facing the sealing element 1 to correspond to the contour of the sealing element 1, which leads to a reliable seal in the region of the curved zone which in the closed position of the movable part of the equipment rests resiliently on an opposing surface.

In pipes which are subjected to hot gas there is a danger that condensation and resulting pitting will occur on the cold side of the sealing element facing the hot gas. In order to exclude this danger, it is possible within the scope of the invention for the sealing element facing the hot gas to be heated, which can be achieved for example by means of a heating spiral or a hot air stream. If the critical zones of the sealing element are heated in this way to above the dew point temperature, instances of condensation and resulting damage are avoided.

The elastic deformation of all outer surfaces of the periphery illustrated in FIG. 2 by broken lines is particularly characteristic of the sealing element according to the invention. In this way a particularly large sprung peripheral length is produced which makes it possible to achieve the desired springiness of the sealing element with a substantially reduced overall height H.

I claim:

1. A sealing device for use in effecting a hot gas seal between two relatively movable parts, said device comprising at least one springy, integral, resilient metal member having a pair of spaced apart side walls of uniform wall thickness joined at corresponding ends by a convexly domed top wall of corresponding wall thickness, at least one of said side walls being bent at its other end at an angle of substantially 90° and extending toward the other of said side walls to form a bottom wall of corresponding wall thickness underlying said top wall and spanning the space between said side walls thereby forming with said top wall and said side walls a hollow, deformable body, said bottom wall being free of said top wall and said other of said side walls and having an integral extension projecting beyond said body, said other of said side walls having at its other end an extension which extends beyond said body in overlying and confronting relation with said extension of said bottom wall, and means securing said extensions to one another, each of said top, bottom, and side walls being resiliently deformable from a non-deformed condition in response to the application of compressive force on said body in a direction to move said top wall toward said bottom wall, the movement of said top wall toward said bottom wall causing said side walls to bow outwardly of said body and said bottom wall to bow inwardly of said body, the resilience of said walls enabling them to return to their non-deformed condition in response to the removal of said compressive force.

2. A sealing device according to claim 1 wherein said securing means comprises welding.

3. A sealing device according to claim 1 wherein said securing means comprises a clamp.

4. A sealing device according to claim 1 wherein said extensions extend in a direction in prolongation f said bottom wall.

5. A sealing device according to claim 1 wherein said extensions extend in a direction in prolongation of one of said side walls.

6. A sealing device according to claim 1 wherein said bottom wall is flat.

7. A sealing device according to claim 1 wherein said extensions extend longitudinally of said body.

8. A sealing device according to claim 1 including two of said bodies one of which butts the other at an angle of substantially 90°.

9. A sealing device according to claim 8 wherein one of said bodies is cut away between its ends to accommodate one end of the other of said bodies.

10. A sealing device according to claim 9 wherein said one of said bodies has at said one end thereof a thrust piece which is freely movable axially of said one of said bodies and overlaps a portion of said one of said bodies adjacent said one end thereof.

11. The sealing device of claim 1 wherein the means securing the said extensions to one another secures the extensions at a location spaced from said side walls.

12. The sealing device of claim 1 wherein said body is coreless.

13. A sealing device according to claim 1 wherein said other of said side walls is bent at its other end at an angle of substantially 90° and wherein said second extension extends from said housing in the same direction as said first extension.

14. A sealing device according to claim 13 wherein said other of said side walls is shorter than said one of said side walls.

15. A sealing device according to claim 1 wherein said extension of said bottom wall is bent at an angle of substantially 90° to said bottom wall and extends in a direction away from said body and wherein said extension of said other of said side walls extends in prolongation of said other side wall.

16. A sealing device according to claim 1 including aligned openings in said extensions for the accommodation of connecting means.

17. A sealing device according to claim 1 wherein one of said relatively movable parts comprises a flat support on which said bottom wall is seated.

18. A sealing device according to claim 17 including connecting means extending through said extensions and into said support for connecting said body on said support.

19. A sealing device according to claim 17 wherein the other of said relatively movable parts comprises an element engageable with said top wall and movable in opposite directions respectively toward and away from said bottom wall.

20. A sealing device according to claim 17 wherein the said bottom wall has its entire area in engagement with said support.

21. A sealing device according to claim 17 wherein a portion of said bottom wall is free of engagement with said support, said portion being closer to said one of said side walls than to said other of said side walls.

* * * * *

UNITED STATES PATENT AND TRADEMARK OFFICE
CERTIFICATE OF CORRECTION

PATENT NO. : 5,193,823
DATED : March 16, 1993
INVENTOR(S) : Hans-Jurgen Janich

It is certified that error appears in the above-identified patent and that said Letters Patent is hereby corrected as shown below:

Column 5, line 2, change "f" to -- of --.

Signed and Sealed this

Twenty-third Day of November, 1993

*Attest:*

BRUCE LEHMAN

*Attesting Officer*  *Commissioner of Patents and Trademarks*